US00RE35596E

United States Patent [19]

Diener et al.

[11] E Patent Number: Re. 35,596

[45] Reissued Date of Patent: Aug. 26, 1997

[54] LOCKING MOLDED GOLF CLUB HEADCOVER

[75] Inventors: Lawrence R. Diener, Fenton; Joseph J. Ventimiglia, St. Florissant, both of Mo.

[73] Assignee: Sinclair & Rush, Inc., St. Louis, Mo.

[21] Appl. No.: 516,161

[22] Filed: Aug. 17, 1995

Related U.S. Patent Documents

Reissue of:

[64] Patent No.: 5,415,213
Issued: May 16, 1995
Appl. No.: 174,767
Filed: Dec. 29, 1993

[51] Int. Cl.[6] ..... B65D 65/06

[52] U.S. Cl. ..... 150/160; 206/315.4

[58] Field of Search ..... 150/160, 162, 150/159, 154, 900; 206/315.4, 315.3

[56] References Cited

U.S. PATENT DOCUMENTS

| | | | |
|---|---|---|---|
| D. 150,052 | 6/1948 | Booxbaum . | |
| D. 184,827 | 4/1959 | Mesinger . | |
| 2,737,394 | 3/1956 | Abel | 150/160 X |
| 3,016,940 | 1/1962 | Mullin | 150/900 X |
| 3,051,210 | 8/1962 | Mesinger . | |
| 3,063,487 | 11/1962 | Mullin | 150/900 |
| 3,133,577 | 5/1964 | Bellevue, Sr. . | |
| 3,255,794 | 6/1966 | Morse . | |
| 3,426,815 | 2/1969 | Ashlin et al. . | |
| 3,478,799 | 11/1969 | Hoyt, Jr. . | |
| 3,593,769 | 7/1971 | Spears . | |
| 3,606,368 | 9/1971 | Brenner . | |
| 3,861,434 | 1/1975 | Harding | 150/160 |
| 4,898,222 | 2/1990 | Gaffney . | |
| 4,907,694 | 3/1990 | Miller et al. | 150/900 X |
| 4,971,126 | 11/1990 | Borenstein . | |
| 5,000,238 | 3/1991 | Zeller . | |
| 5,005,624 | 4/1991 | Sung | 150/160 |
| 5,050,655 | 9/1991 | Borenstein . | |
| 5,105,863 | 4/1992 | Cirone . | |
| 5,322,105 | 6/1994 | Meek . | |
| 5,403,009 | 4/1995 | Gleason, Jr. | 150/160 X |

FOREIGN PATENT DOCUMENTS

| | | |
|---|---|---|
| 261329 | 5/1965 | Australia . |
| 1360058 | 7/1974 | United Kingdom . |
| WO9008576 | 8/1990 | WIPO . |

*Primary Examiner*—Allan N. Shoap
*Assistant Examiner*—Christopher J. McDonald
*Attorney, Agent, or Firm*—Polster, Lieder, Woodruff, Lucchesi, L.C.

[57] ABSTRACT

A one-piece molded flexible plastic material golf club headcover for use with a golf club, including a golf club head and shank, is disclosed. The golf club headcover includes a golf club headcover section for substantially surrounding the golf club head. A flexible and resilient restricted throat is formed in the golf club headcover section which has an internal dimension smaller than the golf club head such that upon insertion of the golf club head, the flexible and resilient restricted throat deforms and expands to allow passage of the golf club head into the golf club headcover section and subsequent return to its initial configuration. Locking elements are formed in the golf club headcover section independent of the flexible and resilient restricted throat for underlying the golf club head while releasably holding the golf club headcover section on the golf club head. The locking elements include complementary interengaging male and female elements formed in opposing flexible and resilient wall sections of the golf club headcover section.

22 Claims, 2 Drawing Sheets

LOCKING MOLDED GOLF CLUB HEADCOVER

Matter enclosed in heavy brackets [ ] appears in the original patent but forms no part of this reissue specification; matter printed in italics indicates the additions made by reissue.

BACKGROUND OF THE INVENTION

The present invention relates to a one-piece molded flexible plastic material golf club headcover for a golf club, the golf club headcover including a locking feature to prevent inadvertent or accidental dislodgement of the golf club headcover from a golf club.

It is well known that there are various types and kinds of golf club headcovers to protect golf club heads against damage and deterioration. Such golf club headcovers are made from a variety of different materials including knitted or woven textile materials; semi-flexible materials such a leather, nylon and the like; and even more flexible material such as slip-on or hinge-type molded plastic headcovers. The present invention relates to slip-on molded flexible plastic material golf club headcovers of the type shown in our prior U.S. Pat. No. 5,117,884.

As disclosed in our aforementioned prior U.S. patent, the golf club headcover includes a golf club headcover section for surrounding the golf club head and an integral skirt section that extends from the golf club headcover section for substantially surrounding a portion of the shank immediately adjacent the golf club head. The integral skirt section is formed with a flexible and resilient circumferential wall that is configured, arranged and dimensioned to deform and then return to its original shape upon the insertion and removal of a golf club head, in order to releasably hold the golf club headcover to a golf club head. The flexible and resilient circumferential wall is formed by a flexible and resilient restricted throat that has an internal dimension smaller than the golf club head such that upon insertion into the golf club headcover, the flexible and resilient restricted throat deforms and expands to allow the passage of the golf club head into the golf club headcover and then subsequently returns to its original configuration, for initially releasably holding the golf club headcover to the golf club head.

The golf club headcover shown in our aforementioned patent has worked well in connection with wood golf club headcovers since the integral skirt section has a substantial length; however, the integral skirt section for iron golf clubs is quite small. As a result, it has been found that headcovers for iron golf clubs are sometimes too easily dislodged. This occurs during normal handling and use of irons either within the golf bag or just prior to or after use.

The present invention is designed to retain all of the advantages of the one-piece molded flexible plastic material golf club headcover disclosed in our prior aforementioned patent, while further incorporating a locking feature to prevent accidental displacement or dislodgement from a golf club head.

SUMMARY OF THE INVENTION

Among the several objects and advantages of the present invention include:

The provision of a new and improved one-piece molded flexible plastic material golf club headcover which includes a locking feature to prevent accidental displacement or dislodgement from a golf club head;

The provision of the aforementioned golf club headcover in which the locking feature positively remains the golf club headcover on the golf club head while also permitting releasable disengagement, when desired;

The provision of the aforementioned golf club headcover in which the locking feature includes complementary interengaging male and female elements formed in opposing wall sections of the golf club headcover;

The provision of the aforementioned golf club headcover in which the locking feature is associated with a flexible and resilient restricted throat formed in the golf club headcover for deformation and expansion upon the insertion and removal of a golf club head; and The provision of the aforementioned golf club headcover which is strong and durable, provides protection against marring to valuable clubs from damage during shipment or play, provides waterproof protection for expensive golf clubs, is easy to keep clean, and is otherwise well adapted for the purposes intended.

Briefly stated, the present invention relates to a one-piece molded flexible plastic material golf club headcover for use with a golf club having a golf club head and a shank. The golf club headcover includes a golf club headcover section for substantially surrounding the golf club head. Locking means are associated with the golf club headcover section for underlying the golf club head while releasably holding the golf club head-cover section on the golf club head. The locking means includes complementary interengaging male and female elements formed in opposing wall sections of the golf club headcover section.

A flexible and resilient restricted throat is formed in the golf club headcover section for deformation and expansion upon the insertion and removal of a golf club head, in order to at least releasably engage the golf club headcover relative to the golf club head. The locking means is formed in the vicinity of the flexible and resilient restricted throat for cooperative interaction therewith. Specifically, the complementary interengaging male and female elements are spaced upwardly from but cooperate with the flexible and resilient restrictive throat in the opposing wall sections of the golf club headcover section, in order to positively releasably hold the golf club headcover on the golf club head.

While a number of different constructions are available for the male and female elements of the locking means, preferably the male element extends inwardly within the golf club headcover section and is of substantially smaller size than the female element.

These and other objects and advantages of the present invention will be apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENTS

Figure 1:
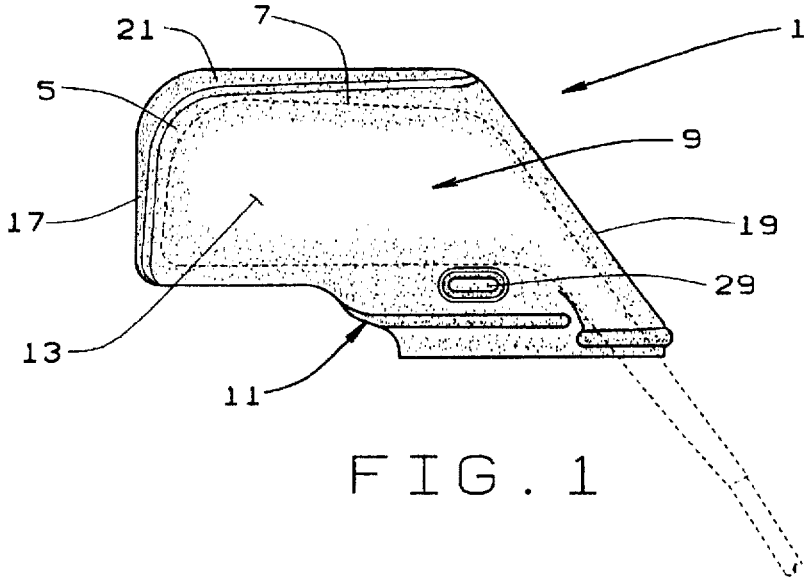
FIG. 1 is a side elevational view of the locking molded golf club headcover of the present invention with a golf club shown in phantom lines assembled therein.

Although the locking molded golf club headcover of the present invention is capable of being used with both wood and irons golf club headcovers, the primary use appears to be iron golf clubs. Thus, in the drawings and the description that is to follow, the locking molded golf club headcover is shown as being used in connection with iron golf clubs. However, it will also be understood that wood club headcovers could also be constructed using the features of the present invention.

Figure 2:
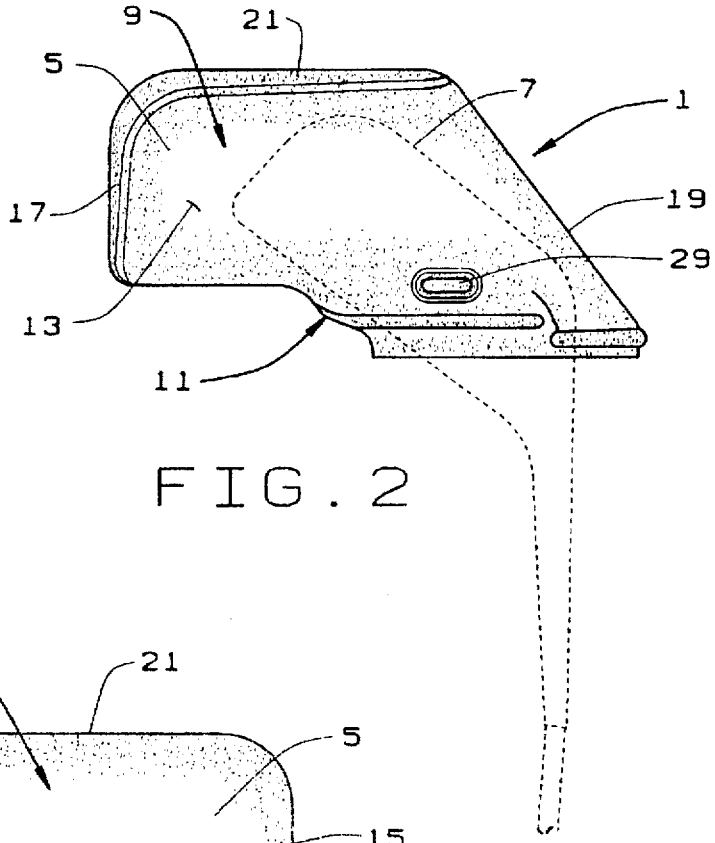
FIG. 2 is a side elevational view of the locking molded golf club headcover of the present invention and illustrating in phantom lines a golf club being removed therefrom.
Figure 3:
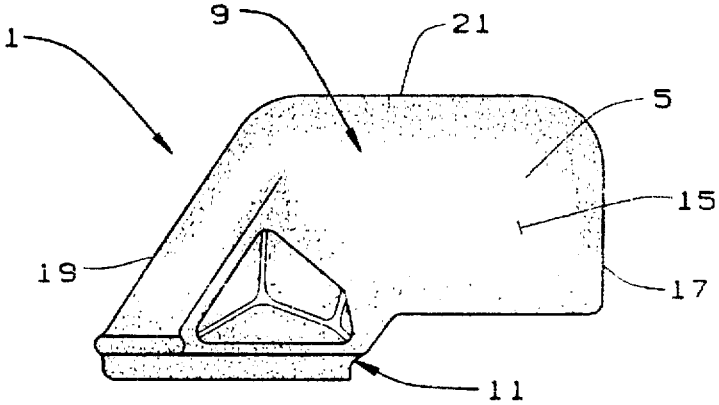
FIG. 3 is a side elevational view of an opposite side of the locking molded golf club headcover of the present invention.

The golf club headcover for irons 1 shown in the drawings is preferably formed by dip molding techniques. Specifically, a mold mandrel (not shown) conforming to the inside shape and configuration of the iron golf club headcover 1 is dipped into a bed of plastisol, such as polyvinylchloride or the like, which also is preferably a coarse grain material composition. Because the mold mandrel (not shown) is sufficiently heated, the interior wall surface 3 (see FIGS. 7–8) is formed with a smooth wall surface configuration, while the exterior surface 5, as shown in FIGS. 1-3, is textured, due to the coarse grain material remaining out of contact with the mold mandrel (not shown). As a result, an iron golf club 7 will slide easily along the smooth interior wall surface 3, during assembly and disassembly relative to the locking molded golf club headcover 1, as illustrated by the phantom line representations of the iron golf club 7 in FIGS. 1–2 of the drawings. On the other hand, the textured exterior wall surface 5 enables a golfer to more easily grip the locking molded golf club headcover 1, during the assembly and disassembly of an iron golf club 7. The manner of constructing and using the smooth interior wall surface 3 and the textured exterior wall surface 5, in a golf club headcover, is described in greater detail in our aforementioned U.S. Pat. No. 5,117,884.

The iron golf club headcover 1 shown in FIGS. 1–8 of the drawings includes a golf club headcover section 9 that is formed in the shape of the head of an iron golf club 7, in order to surround the head of the iron golf club 7. Extending below the golf club headcover section 9 is an integral skirt section 11 which is constructed to allow passage of the iron golf club 7 into and out of the golf club headcover section 9, as will be presently described.

It is well known that the heads of iron golf clubs extend at various angles due to the shape and construction of iron golf clubs used in the game of golf. As a result, the golf club headcover section 9 illustrated in FIGS. 1–8 of the drawings is representative of one angular offset shape corresponding to the angular offset of a particular iron club head. It will thus be understood that the angular offset shape of golf club headcover sections 9 will vary depending on the angular offset of the particular club face for which it is made. Regardless of the particular angular offset shape of a golf club headcover section 9, the golf club headcover section 9 and its integrally associated skirt section 11 have numerous common features.

In this connection, the golf club headcover section 9 is shown to include front and rear walls 13, 15, corresponding to the front and rear faces of an iron club head (not shown), as well as front and rear end walls 17, 19, also corresponding to the front and end surfaces of the iron club head (not shown). The golf club headcover section 9 further includes a top wall 21 interconnecting front and rear walls 13, 15 and front and rear end walls 17, 19, as best seen in FIGS. 1–2 of the drawings. The top wall 21 is suitable for imprinting or stamping suitable indicia, such as a number identification of the particular iron golf club with which the golf club headcover 1 is to be used.

Figure 4:
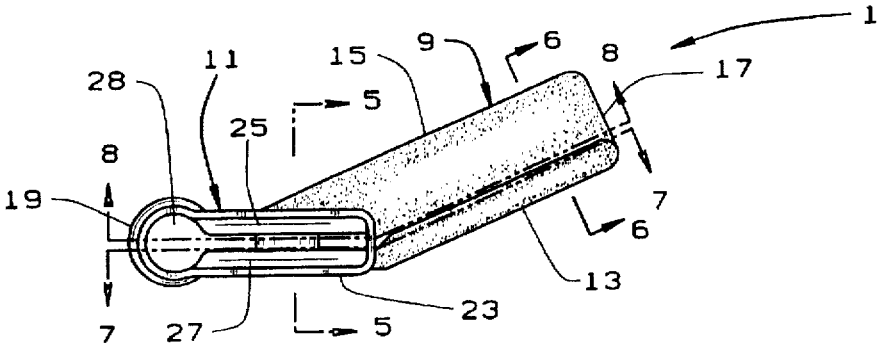
FIG. 4 is a bottom plan view of the locking molded golf club headcover of the present invention.
Figure 5:
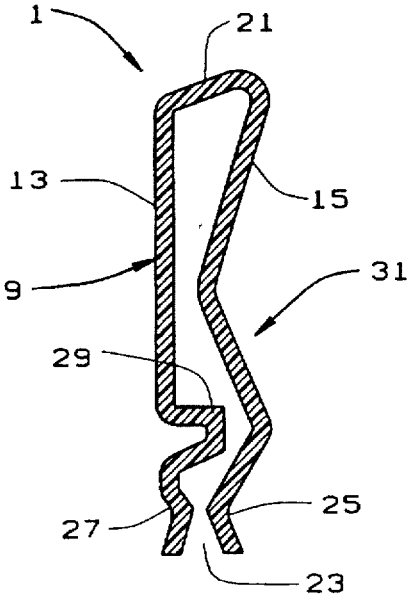
FIG. 5 is an enlarged sectional view of the locking molded golf club headcover as viewed along lines 5—5 of FIG. 4.

The golf club headcover section 9 includes the integral skirt section 11 which has a flexible and resilient restricted throat configuration requiring deformation and expansion in order to allow the passage of an iron head into and out of the golf club headcover 1. In this connection, and as best seen in FIG. 4 of the drawings, the integral skirt section 11 has a generally collapsed oval cross-sectional configuration 23 forming the flexible and resilient restricted throat configuration. In immediate proximity to the generally collapsed oval cross sectional configuration 23, there is provided inwardly directed elongated ribs 25, 27, as shown in FIGS. 4–5, which extend for substantially the entire length of the collapsed oval cross sectional configuration 23, with the exception of one end [29] *28* which has a generally circular inner wall configuration conforming in shape to the shank of the iron golf club 7. It will be appreciated that the inwardly directed elongated ribs 25, 27, together with the generally oval cross sectional configuration 23 at the outer free end of the integral skirt section 11 provides the flexible and resilient restricted throat configuration which must be opened and then closed during the passage of the head of the iron golf club 7 into and out of the golf club headcover section 9.

In FIG. 1 of the drawings, the head of the iron golf club 7 is shown as being positioned within the golf club headcover section 9 of the golf club headcover 1. In such position, the golf club headcover section 9 surrounds the head of the golf club iron 7, as illustrated. As the iron golf club 7 is removed from the golf club headcover section 9, it will be noted that the shank of the iron golf club 7 is tilted, as best seen in FIG. 2 of the drawings, in order to allow the head of the iron golf club 7 to readily pass through the generally collapsed oval cross sectional configuration 23 of the integral skirt 11. In so doing, the head of the iron golf club 7, due to its angular offset shape, will cause the generally collapsed oval cross-sectional configuration 23 to deform and expand, in order to allow the head of the iron golf club 7 to pass therethrough. Thereafter, the generally collapsed oval cross sectional configuration 23 of the integral skirt 11 returns to its original configuration. It will be apparent that by reversing the aforementioned steps, the head of the iron golf club 7 can be positioned from the FIG. 2 to the FIG. 1 location relative to the golf club headcover section 9 where it is initially releasably held in position, due to the flexible and resilient restricted throat configuration 23 of the integral skirt section 11.

All of the features described above are generally disclosed in our aforementioned U.S. Pat. No. 5,177,884, although the general overall shape and configuration of the golf club headcover 1 in the present invention differs somewhat, due, in part, to some of the important inventive features of the present invention.

The generally collapsed oval cross sectional configuration 23 of the integral skirt 11 functions, at least in part, in releasably holding a golf club headcover 1 with respect to an associated golf club. However, it has been discovered that accidental dislodgement or disassociation of a golf club headcover 1 relative to a golf club occurs more than is desired. Accordingly, the present invention incorporates locking features in the golf club headcover 1 which overcome this problem.

In this connection attention is now directed to the locking feature incorporated in the golf club headcover 1. The locking feature includes complementary interengaging male and female elements 29, 31 formed in opposing front and rear wall sections 13, 15 of the golf club headcover section 9. As best seen in FIGS. 1–3 and 5–7 of the drawings, the integrally formed male element 29 is formed in the golf club headcover section 9 generally at the juncture of the golf club headcover section 9 with its depending integral skirt section 11. The integrally formed male element 29 is formed with a generally oval configuration as a result of an inwardly directed oval depression formed in the rear wall 13, as best illustrated in FIG. 5 of the drawings.

The complementary interengaging female element 31, which is formed in the rear wall 15 as a modified pyramidal shape is best shown in FIGS. 3–8 of the drawings. The modified pyramidal shape is formed in both the golf club head section P and its integral skirt section 11. The cross sectional shape of this modified pyramidal female element 31 is best shown in FIG. 5 of the drawings as generally representing a cross-sectional V-shape construction in the area of its complementary interengagement with the male element 29.

Because the complementary interengaging male and female elements 29, [13] *33* are formed in the vicinity of the flexible and resilient restricted throat provided by the generally collapsed oval cross-sectional configuration 23 of the depending skirt 11, the complementary interengaging male and female elements 29, 31 will function to prevent accidental dislodgement or removal of the head of an iron golf club 7 from the golf club headcover section 9. Thus, the complementary interengaged male and female elements 29, 31, together with the flexible and resilient restricted throat of the collapsed oval cross sectional configuration 23 in the depending skirt section 11, provides a positive interengaging structure which substantially prevents inadvertent or accidental removal or dislodgement of the golf club headcover 1 from the head of an iron golf club 7.

Note further that the male element 29 is positioned below the head of the iron golf club 7 for underlying same, as shown in FIG. 1 of the drawings. This provides further assistance to the interengaged male and female elements 29, 31 and the collapsed oval cross sectional configuration 23 of the depending internal skirt section 11 in retaining a golf club head within the golf club headcover section 9. As a result, accidental displacement or dislodgement of a golf club relative to the golf club headcover section 9 and its associated depending integral skirt section 11 is substantially minimized or prevented.

Figure 6:
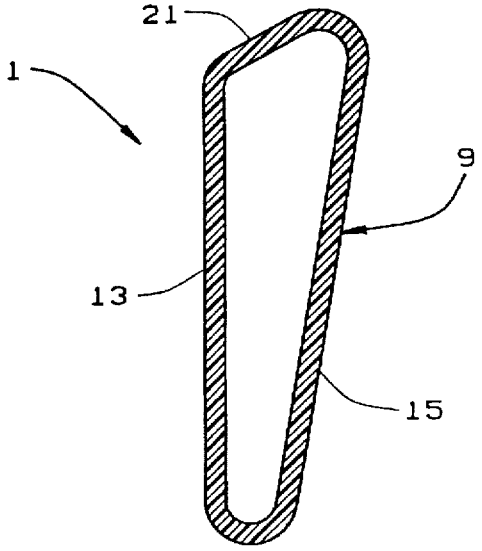
FIG. 6 is an enlarged sectional view of the locking molded golf club headcover as viewed along lines 6—6 of FIG. 4.
Figure 7:
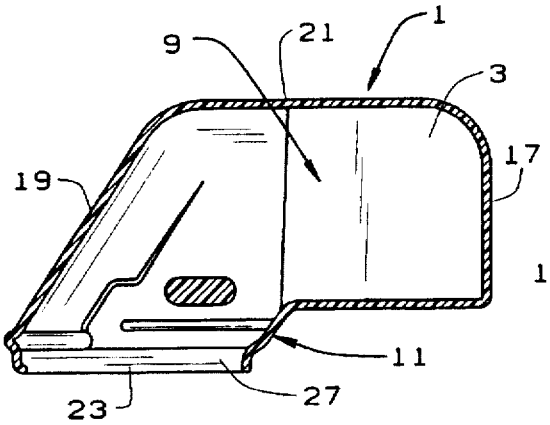
FIG. 7 is an elevational view, partly in section, of the locking molded golf club headcover as viewed along lines 7—7 of FIG. 4.
Figure 8:
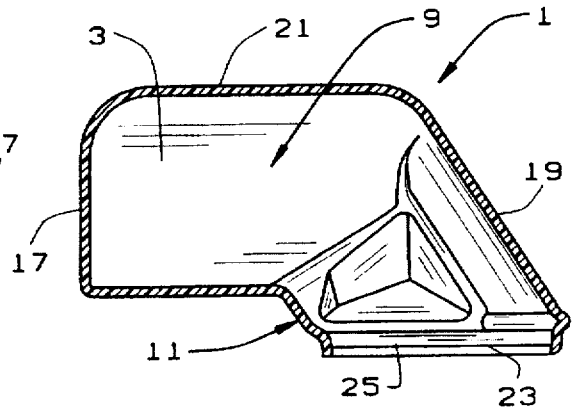
FIG. 8 is an elevational view, partly in section, of the locking molded golf club headcover as viewed along lines 8—8 of FIG. 4.

At the same time, when it is desired to remove or re-apply the golf club headcover 1 relative to the head of an iron golf club 7, the golf club headcover 1 can function in the manner previously described to allow removal and subsequent reinsertion of the head of an iron golf club 7 within the golf club headcover 1. *In this regard, it will be seen from FIGS. 5–7 of the drawings that even when the complementary male and female locking elements 29, 31 are in engaged position, they occupy a limited part of the restricted throat area and are spaced a small predetermined distance from each other when in such engaged position, in order to facilitate resilient deformation of the flexible and resilient male and female locking elements 29, 31 upon the insertion and removal of a golf club head.*

From the foregoing, it will now be appreciated that the one-piece molded flexible plastic material golf club headcover of the present invention provides numerous features and advantages not shown by the prior art, while achieving the several objects and features of the present invention with unexpected advantageous results.

As various changes could be made in the above construction without departing from the scope of the invention, it is intended that all matter contained in the above description or shown in the accompanying drawings shall be interpreted as illustrative and not in a limiting sense.

We claim:

1. A one-piece molded flexible plastic material golf club headcover for use with a golf club having a golf club head and shank, comprising:

a golf club headcover section for substantially surrounding the golf club head, and flexible and resilient complementary male and female locking elements formed in a restricted throat area of said headcover section [biased] *biased* for resilient deformation to a non-engaged position upon the insertion and removal of a golf club head and for resilient return to an engaged position below the golf club head after passage of the golf club head through said restricted throat area and into said golf club headcover section for releasably holding the golf club headcover to the golf club head, *said complementary male and female locking elements occupying a limited part of the restricted throat area and being at least partially spaced a small predetermined distance from each other when in engaged position in order to facilitate resilient deformation of the male and female locking elements upon the insertion and removal of a golf club head.*

2. The golf club headcover as defined in claim 1 wherein the flexible and resilient complementary interengaging male and female locking elements are in a flexible and resilient restricted throat in the opposing wall sections of the golf club headcover section.

3. The golf club headcover as defined in claim 2 wherein the male element extends inwardly within the golf club headcover section and underlies the golf club head.

4. The golf club headcover as defined in claim 3 wherein the flexible and resilient restricted throat has a generally collapsed oval configuration substantially larger than the male and female locking elements, and the male locking element has a generally oval exterior shape which is substantially smaller than a modified pyramidal shape of the female locking element.

5. A one-piece molded flexible plastic material golf dub headcover for use with a golf club having a golf club head and shank, comprising:

a golf club headcover section for substantially surrounding the golf club head;

a flexible and resilient restricted throat [foraged] *formed* in the golf club headcover section which has an internal dimension smaller than the golf club head such that upon insertion of the golf club head, the flexible and resilient restricted throat deforms and expands to allow the passage of the golf club head into the golf club headcover section and subsequent return to its initial configuration; and flexible and resilient complementary interengaged male and female elements formed in the golf club headcover section in the vicinity of the flexible and resilient restricted throat, said complementary interengaged male and female elements being flexibly and resiliently separated from one another to non-engaged position as the flexible and resilient restricted throat deforms and expands to allow passage of the golf club head, and said complementary interengaged male and female elements being flexibly and resiliently returned to engaged position after passage of the golf club head for underlying the golf club head and releasably holding the golf club headcover section on the golf club head, *and said complementary interengaged male and female elements occupying a limited part of the restricted throat area and being at least partially spaced a small predetermined distance from each other when in engaged position in order to facilitate resilient deformation of the male and female elements upon the insertion and removal of a golf club head.*

6. The golf club headcover as defined in claim 5 wherein the complementary interengaged male and female elements are formed in opposing flexible and resilient wall sections of said golf club headcover section.

7. The golf club headcover as defined in claim 6 wherein the male element is adapted to be positioned below the golf club head while being complementary engaged with the female element for releasably holding the golf club headcover section to the golf club head.

8. The golf club headcover as defined in claim 7 wherein the male element extends inwardly within the golf club headcover section and is of substantially smaller size than the female element.

9. The golf club headcover as defined in claim 5 wherein the male element has a general oval configuration and the female element has a modified pyramidal shape.

10. The golf club headcover as defined in claim 9 wherein the flexible and resilient restricted throat has a generally collapsed oval configuration.

*11. A one-piece molded flexible plastic material golf club headcover for use with a golf club having a golf club head and shank, comprising:*

*a golf club headcover section for substantially surrounding the golf club head, and flexible and resilient locking elements provided in a restricted throat area of said headcover section biased for resilient deformation to a non-engaged position upon the insertion and removal of a golf club head and for resilient return to an engaged position below the golf club head after passage of the golf club head through said restricted throat area and into said golf club headcover section for releasably holding the golf club headcover to the golf club head, at least one of the flexible and resilient locking elements extending at least partially across the restricted throat area to provide underlying positive structural interference within the restricted throat area of at least one of the flexible and resilient locking elements with a golf club head when the flexible and resilient locking elements are in engaged position said flexible and resilient locking elements being in structurally cooperating relationship with said restricted throat area to resist inadvertent opening of the restricted throat area and accidental dislodgment of the golf club headcover from the golf club head, and said flexible and resilient locking elements occupying a limited part of the restricted throat area while also being at least partially spaced a small predetermined distance from each other when in engaged position in order to facilitate resilient deformation of the flexible and resilient locking elements upon the insertion and removal of a golf club head.*

*12. A molded flexible plastic material golf club headcover for use with a golf club having a golf club head and shank, comprising:*

*a golf club headcover section for substantially surrounding the golf club head, and flexible and resilient locking elements provided in a restricted throat area of said headcover section biased for resilient deformation to a non-engaged position upon the insertion and removal of a golf club head and for resilient return to an engaged position below the golf club head after passage of the golf club head through said restricted throat area and into said golf club headcover section for releasably holding the golf club headcover to the golf club head, at least one of the flexible and resilient locking elements extending at least partially across the restricted throat area to provide underlying positive structural interference within the restricted throat area of at least one of the flexible and resilient locking elements with a golf club head when the flexible and resilient locking elements are in engaged position, said flexible and resilient locking elements being in structurally cooperating relationship with said restricted throat area to resist inadvertent opening of the restricted throat area and accidental dislodgment of the golf club headcover from the golf club head, and said flexible and resilient locking elements occupying a limited part of the restricted throat area while also being at least partially spaced a small predetermined distance from each other when in engaged position in order to facilitate resilient deformation of the flexible and resilient locking elements upon the insertion and removal of a golf club head.*

*13. The golf club headcover as defined in claim 11 wherein the flexible and resilient locking elements are in a flexible and resilient throat in opposing wall sections of the golf club headcover section.*

*14. A molded flexible plastic material golf club headcover for use with a golf club having a golf club head and shank, comprising:*

*a golf club headcover section for substantially surrounding the golf club head;*

*a flexible and resilient restricted throat formed in the golf club headcover section which has an internal dimension smaller than the golf club head such that upon insertion of the golf club head, the flexible and resilient restricted throat deforms and expands to allow the passage of the golf club head into the golf club headcover section and subsequent return to its initial configuration; and*

*flexible and resilient locking elements formed in the golf club headcover section in the vicinity of the flexible and resilient throat, said flexible and resilient locking elements being flexibly and resiliently separated from one another to non-engaged position as the flexible and resilient restricted throat deforms and expands to allow passage of the golf club head, and said flexible and resilient locking elements being flexibly and resiliently returned to engaged position after passage of the golf club head for underlying the golf club head and releasably holding the golf club headcover section on the golf club head, at least one of the flexible and resilient locking elements extending at least partially across the restricted throat area to provide underlying positive structural interference within the restricted throat area of at least one of the flexible and resilient locking elements with a golf club head when the flexible and resilient locking elements are in engaged position, said flexible and resilient locking elements being in structurally cooperating relationship with said restricted throat area to resist inadvertent opening of the*

*restricted throat area and accidental dislodgment of the golf club headcover from the golf club head, and said flexible and resilient locking elements occupying a limited part of the restricted throat area while also being at least partially spaced a small predetermined distance from each other when in engaged position in order to facilitate resilient deformation of the flexible and resilient locking elements upon the insertion and removal of a golf club head.*

*15. A molded flexible plastic material golf club headcover for use with a golf club having a golf club head and shank, comprising:*

*a golf club headcover section for substantially surrounding the golf club head; and*

*a locking element extending at least partially across a restricted throat area of said golf club headcover biased for resilient deformation to a non-engaged position upon the insertion and removal of a golf club head and for resilient return to an engaged position below at least a portion of the golf club head after passage of the golf club head through said restricted throat area and into said golf club headcover section for releasably holding the golf club headcover to the golf club head, said locking element extending at least partially across and being in structurally cooperating relationship with said restricted throat area when said locking element is in engaged position to provide positive underlying structural interference within the restricted throat area in order to resist inadvertent opening of the restricted throat area and accidental dislodgment of the golf club headcover from the golf club head, and said locking element occupying a limited part of the restricted throat area and being at least partially spaced from the restricted throat by a small predetermined distance when in engaged position in order to facilitate resilient deformation to a non-engaged position upon the insertion and removal of a golf club head.*

*16. The golf club headcover of claim 15 wherein said locking element further comprises a first locking member on one side of said restricted throat area and a second locking member on an opposite side of said restricted throat area, said respective locking members being resiliently biased toward each other.*

*17. A flexible golf club headcover for use with a golf club having a golf club head and shank, comprising:*

*a golf club headcover section for substantially surrounding the golf club head;*

*an integral skirt section extending below the headcover section, said skirt section having a flexible resilient throat with a collapsed oval cross-section including a substantially circular-shaped opening at one end thereof to accommodate the shank of the golf club; and*

*locking elements on at least one of said skirt skirt section or headcover section adjacent said substantially circular-shaped opening, said locking elements being arranged to close said throat when in engagement position with a golf club head for securing the substantially circular-shaped opening of said skirt section around the shank of the golf club, said locking elements extending at least partially across and being in structurally cooperating relationship with said throat when said locking elements are in engagement position with a golf club head to resist inadvertent opening of the throat and accidental dislodgment of the golf club headcover from the golf club head, and said locking elements occupying a limited part of the flexible resilient throat while also being at least partially spaced a small predetermined distance from each other when in engagement position with a golf club head in order to facilitate resilient deformation of the locking elements upon the insertion and removal of a golf club head.*

*18. The golf club headcover of claim 17 wherein said locking elements further comprise a first locking element on a first side of at least one of said skirt section or headcover section and a second locking element on a second side of at least one of said skirt section or headcover section said first and second locking elements being in normally biased closed relationship when said golf club headcover section surrounds the golf club head.*

*19. A molded flexible plastic material golf club headcover for use with a golf club having a golf club head and shank, comprising:*

*a golf club headcover section for substantially surrounding the golf club head; and*

*a locking element extending at least partially across a restricted throat area of said golf club headcover biased for resilient deformation to a non-engaged position upon the insertion and removal of a golf club head and for resilient return to an engaged position below at least a portion of the golf club head after passage of the golf club head through said restricted throat area and into said golf club headcover section for releasably holding the golf club headcover to the golf club head, said locking element being in structurally cooperating relationship with said restricted throat area to resist inadvertent opening of the restricted throat area and accidental dislodgment of the golf club headcover from the golf club head, said locking element further comprising a male locking member on one side of said restricted throat area and a complementary female locking member on an opposite side of said restricted throat area, said respective male or female locking members occupying a limited part of the restricted throat area and being at least partially spaced a small predetermined distance from each other when in engaged position while being resiliently biased toward each other in order to facilitate resilient deformation of the respective male and female locking members upon the insertion and removal of a golf club head.*

*20. A flexible golf club headcover for use with a golf club having a golf club head and shank, comprising:*

*a golf club headcover section for substantially surrounding the golf club head;*

*an integral skirt section extending below the headcover section, said skirt section having a flexible resilient throat with a collapsed oval cross-section including a substantially circular-shaped opening at one end thereof to accommodate the shank of the golf club; and locking elements on at least one of said skirt section or headcover section adjacent said substantially circular-shaped opening, said locking elements being arranged to close said throat and secure the substantially circular-shaped opening of said skirt section around the shank of the golf club, said locking elements being in structurally cooperating relationship with said throat to resist inadvertent opening of the throat and accidental dislodgment of the golf club headcover from the golf club head, said locking elements further comprising a male locking element on a first side of at least one of said skirt section or headcover section and a complementary female locking element on a second side of at least one of said skirt section or headcover section, said first and second locking elements being in*

*normally biased closed relationship when said golf club headcover section surrounds the golf club head, and said respective male and female locking elements occupying a limited part of the flexible resilient throat and being at least partially spaced a small predetermined distance from each other when in engaged position while being resiliently biased toward each other in order to facilitate resilient deformation of the respective male and female locking elements upon the insertion and removal of a golf club head.*

*21. A flexible golf club headcover for use with a golf club having a golf club head and shank, comprising:*

*a golf club headcover section for substantially surrounding the golf club head;*

*an integral skirt section extending below the headcover section, said skirt section having a flexible resilient throat with a collapsed oval cross-section including a substantially circular-shaped opening at one end thereof to accommodate the shank of the golf club; and*

*locking elements on at least one of said skirt section or headcover section adjacent said substantially circular-shaped opening, said locking elements being arranged to close said throat when in engagement position with a golf club head in order to secure the substantially circular-shaped opening of said skirt section around the shank of the golf club, said locking elements being in structurally cooperating relationship with said throat to resist inadvertent opening of the restricted throat section and accidental dislodgment of the golf club headcover from the golf club head, said locking elements further comprising a first locking element on a first side of at least one of said skirt section or headcover section and a complementary second locking element on a second side of at least one of said skirt section or headcover section, said complementary first and second locking elements being normally resiliently biased toward each other with a least one locking element extending at least partially across the throat when the locking elements are in engagement position with a golf club head for securing the substantially circular-shaped opening of said skirt section around the shank of the golf club, and said complementary first and second locking elements occupying a limited part of the flexible resilient throat and being at least partially spaced from each other when in engagement position with a golf club head to facilitate resilient deformation of said complementary first and second locking elements upon the insertion and removal of a golf club head.*

*22. The golf club headcover as defined in claim 21 wherein the complementary first and second locking elements are in substantially confronting relationship when in engagement position with a golf club head.*

* * * * *